F. W. H. HAMANN.
CAR COUPLING.
APPLICATION FILED DEC. 14, 1920.
1,423,796.
Patented July 25, 1922.
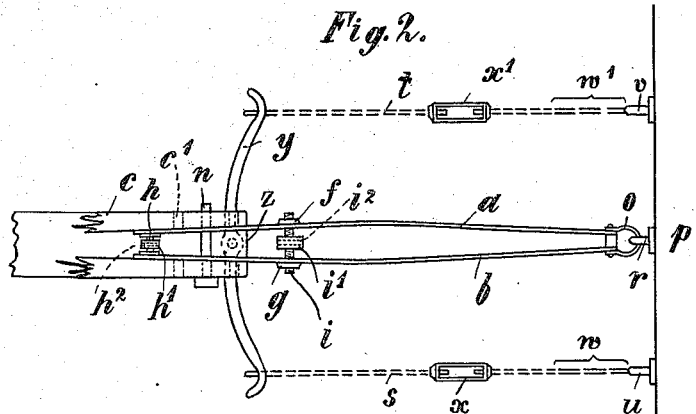
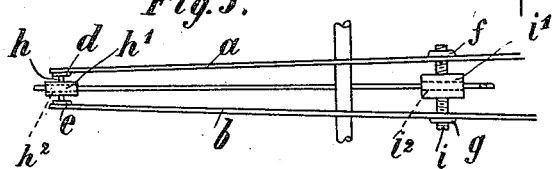
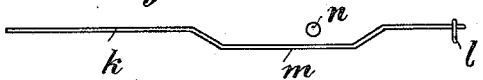
Inventor:
Friedrich Wilhelm Hermann Hamann
by B. Stickney
Attorney

UNITED STATES PATENT OFFICE.

FRIEDRICH WILHELM HERMANN HAMANN, OF HAMBURG, GERMANY.

CAR COUPLING.

1,423,796.  Specification of Letters Patent.  Patented July 25, 1922.

Application filed December 14, 1920. Serial No. 430,745.

*To all whom it may concern:*

Be it known that I, FRIEDRICH WILHELM HERMANN HAMANN, citizen of Germany, residing at Hamburg, have invented certain new and useful Improvements in a Car Coupling, of which the following is a specification.

The present invention refers to a car coupling to connect a trailer or any other car, for instance a furniture car or the like to a motor car or automobile. The coupling consists of two rods, which can be adjusted to the inner shape of a bifurcated car or carriage-pole.

Figure 1 of the drawing is a side view of the car coupling itself.

Figure 2 is the plan of the car coupling in connection with the bifurcated pole of a trailer or the like.

Figure 3 is a plan of the hinder part of the coupling rods to a larger scale and Figure 4 shows a locking bar used in the construction shown in Figure 3.

The car coupling comprises two approximately symmetrical coupler rods $a$ and $b$, which are connected with one another at their front end. When a trailer, for instance a furniture car, is to be connected with a motor car, first of all the hinder ends of the two coupler rods $a$ and $b$ are adjusted with regard to their out converging surface to the V-shape of the opening $c'$ between the prongs of the bifurcated pole $c$ (Figure 2). In different cars evidently the inner shape of the opening or slot of this bifurcated pole will be different. To account for such differences, the hinder ends of the coupler rods $a$ and $b$ are provided with thickened parts or bosses $d, e, f, g$ (Figures 1 to 3). The opposite bosses of each pair on the two rods are provided with borings, screw threaded (right and left). Into these opposite bosses bolts $h$ and $i$ having outer right and left handed threads are screwed, which bolts on their center are provided with a flange or head $h^1$ and $i^1$. By rotating these heads, the ends of the rods $a$ and $b$ are moved towards or away from one another, thus adjusting the angle formed between these converging out surfaces of the ends of the rods to suit the V-shape between the prongs of the bifurcated pole $c$. When the coupler rods by thus turning the screws $h$ and $i$ are adjusted, they are inserted into the slot $c'$ of the pole and then fastened by a coupler pin $n$. In order to prevent the loosening of the springs $h$ and $i$, a locking bar or pin $k$ is inserted into central borings $h^2$ $i^2$ of the head $h'$ and $i'$. To prevent the locking bar $k$ from colliding with the coupler pin $n$, it is joggled at $m$ (Fig. 4). The front ends of the coupler rods $a$ and $b$ are connected to a shackle $o$, which can hook into the hook $r$ attached to the motor car back wall $p$.

To improve on the good operation of the car coupling two chains $s$ and $t$ may be used, which connect lateral arms $y$ at their ends with hooks or rings $u$ also attached to the said front wall $p$. The chains $s$ and $t$ are provided with stretching screws of known description. To conveniently account for greater differences in length, one end $w$ and $w^1$ of the chains $s$ and $t$ may have longer links, while for smaller differences in length the stretching screws with right and left handed threads may be conveniently adjusted.

The chains $s$, $t$ are useful when there is a swing or draft-bar on the pole of the carriage. The arms $y$ are not rigid with the pole, but the two arms $y$ form the swing or draft-bar and are of course pivoted to the pole $z$. The tongues $a$, $b$ pivot about the hook $r$ for the usual purpose.

Regarding the long links on the chains, it is pointed out that the poles of the different carriages have different angles with respect to the bifurcation, and the swing or draft-bar will not always be on the front end, and therefore the chains $s$ and $t$ should not always be the same length with regard to the tongues $a$, $b$, and now and then different links will have to be hooked to the hooks or rings $u$, $v$. The pin $n$ must project through the tongues and the pole, and therefore the distance with which the tongues project into the bifurcation of the pole is determined by the slot $c^1$ of the pole and to make the tongues $a$ and $b$, the cross-section of which will generally be about 1 inch by $2\frac{1}{2}''$, fit the bifurcation of the pole, they must be adjusted by the screws $h$ and $i$, so as to converge at the same angle as the bifurcation of the pole.

I claim:

1. An adjustable car coupling comprising two coupler rods connected with one another at one end, the other end being adapted to converge at their outer surfaces adjustably at different angles, right and left handed screws threaded into the coupler rods at their free ends adapted to vary the angle, at which these ends of the rods converge, central heads on the right and left handed screws.

2. An adjustable car coupling comprising two coupler rods connected with one another at one end, the other end being adapted to converge adjustably at different angles, right and left handed screws threaded into the coupler rods at their free ends adapted to vary the angles, at which these ends of the rods converge, central heads on the right and left handed screws, borings through the heads, a locking pin adapted to enter the borings of the heads of the said screws to lock the screws in their adjusted position.

FRIEDRICH WILHELM HERMANN HAMANN.

Witnesses:
 EMIL HAGER,
 F. A. MAX KAERUPP.